United States Patent [19]

Schreiber

[11] 3,876,829

[45] Apr. 8, 1975

[54] ELECTRO-OPTICAL COMMUNICATION OF VISUAL IMAGES

[75] Inventor: William F. Schreiber, Cambridge, Mass.

[73] Assignee: Massachusetts Institute of Technology, Cambridge, Mass.

[22] Filed: Apr. 20, 1973

[21] Appl. No.: 353,213

[52] U.S. Cl................... 178/7.3 D; 178/7.4; 178/7.6

[51] Int. Cl............................................. H04n 1/22

[58] Field of Search........... 178/7.3 D, 7.5 D, 6.7 R, 178/7.4, 7.6; 340/173 LM

[56] References Cited

UNITED STATES PATENTS

| | | | |
|---|---|---|---|
| 1,717,781 | 6/1929 | Ives | 178/7.4 |
| 1,792,767 | 2/1931 | Schroter | 178/7.4 |
| 1,907,113 | 5/1933 | Huffman | 178/7.6 |
| 2,284,027 | 5/1942 | Thompson | 178/6.7 R |
| 2,706,930 | 4/1955 | Jansen | 178/7.85 |
| 3,095,475 | 6/1963 | Brake | 178/7.85 |
| 3,708,666 | 1/1973 | Barhydt | 178/7.6 |

FOREIGN PATENTS OR APPLICATIONS

| | | | |
|---|---|---|---|
| 19,459 | 10/1935 | Australia | 178/6.7 |

*Primary Examiner*—Robert L. Griffin
*Assistant Examiner*—George G. Stellar
*Attorney, Agent, or Firm*—Arthur A. Smith, Jr.; Robert E. Hillman; Martin M. Santa

[57] ABSTRACT

Electro-optical system for communication of visual images, wherein a receiver reproduces transmitted images by effectively scanning a light beam over an imaging field, the receiver having an inherent spatial scanning frequency associated therewith, and the system includes optics for raising the effective spatial scanning frequency of the receiver to above the inherent frequency, the optics including means for dividing the light beam into multiple sub-beams spatially separated at the imaging field, to correspondingly raise the frequency of any Moire patterns upon ultimate reproduction of the images by a graphical process involving a spatially periodic line or dot structure.

9 Claims, 8 Drawing Figures

FIG.2
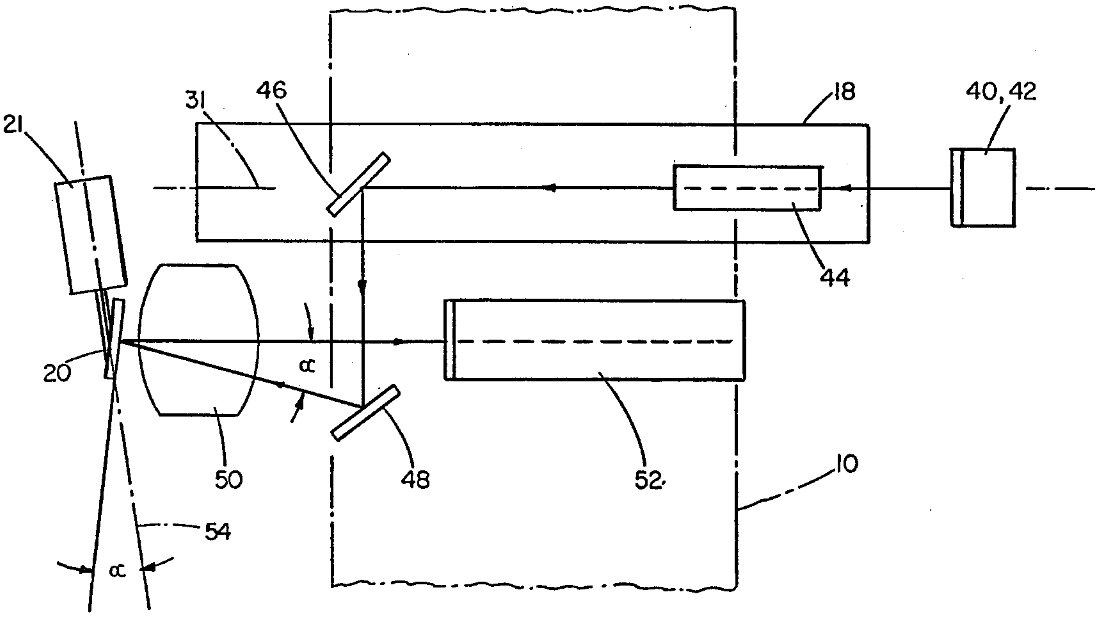
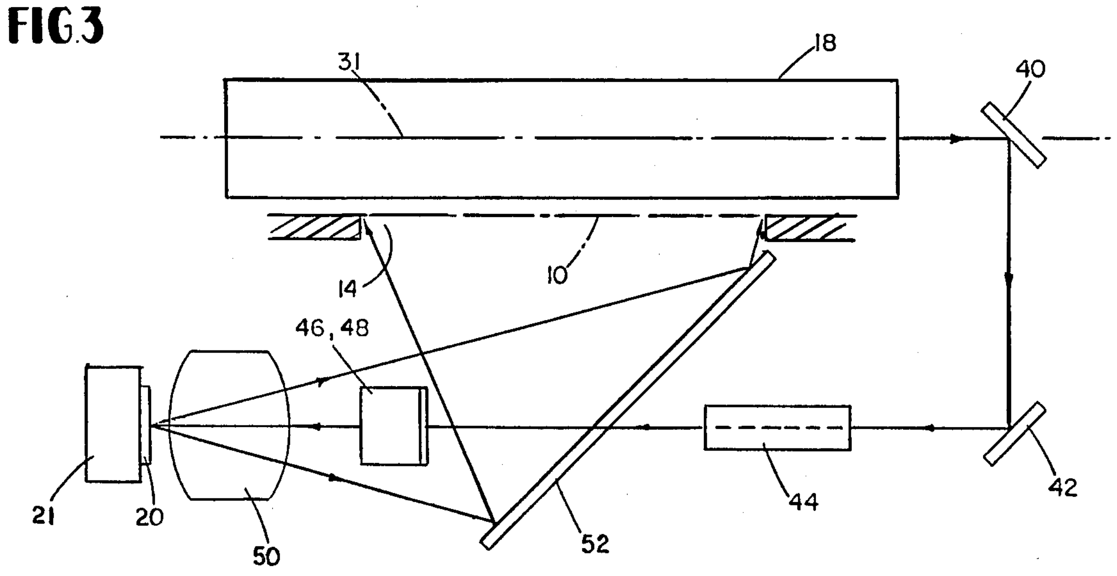

ELECTRO-OPTICAL COMMUNICATION OF VISUAL IMAGES

BACKGROUND OF THE INVENTION

This invention improves the reproduction of visual images transmitted electro-optically, and is useful, e.g., in newspaper facsimile systems.

Images reproduced by a facsimile receiver generally exhibit a line or dot structure due to the scanning nature of the electro-optical reproduction process. When the ultimate graphical process (e.g., photographing through a line screen) also involves a periodic line or dot structure, the danger exists that the respective scanning and graphical spatial frequencies will be close enough to beat, producing Moire patterns.

SUMMARY OF THE INVENTION

The invention, in a simple, reliable, inexpensive manner sharply reduces the visibility of such Moire patterns by raising their spatial frequency, while otherwise retaining high image quality. Further, the invention makes possible reduction of spurious superresolution (e.g., overaccentuation of sharp contrast lines parallel to the scan direction) without loss of desired resolution.

In general the invention features raising the effective spatial scanning (the work scanning being used herein broadly with reference to any electro-optical reproduction process involving a periodic line or dot structure) frequency to above the inherent spatial scanning frequency of the receiver by dividing the light beam into multiple sub-beams spatially separated at the imaging field. In preferred embodiments the effective frequency if raised sufficiently to correspondingly raise the lowest Moire frequency (the difference between the scanning and graphical spatial frequencies, taking into account any enlargement in the graphical process) to above the inherent spatial scanning frequency; the separation at the imaging field of the sub-beams is equal to the separation of adjacent sub-beams derived from successive main beams, thereby eliminating any energy at the inherent scanning frequency. In other preferred embodiments the beam division produces outer sub-beams of intensity half that of an inner subbeam, and successive beams are overlapped to additively superimpose pairs of outer sub-beams without superimposing the inner sub-beams, thereby averaging light intensity at the beam edges and softening contrasts to avoid spurious superresolution. In yet other preferred embodiments the receiver scans in dots along two perpendicular axes and the light beam is separated into at least four sub-beams spatially separated along both axes at the imaging field.

Other advantages and features of the invention will be apparent from the description and drawings herein of a preferred embodiment thereof.

BRIEF DESCRIPTION OF THE DRAWINGS

FIG. 2 is a schematic elevation of the complete optical system of the transmitter of FIG. 1;

FIG. 3 is a top view corresponding to FIG. 2;

DESCRIPTION OF THE PREFERRED EMBODIMENT

Figure 1:
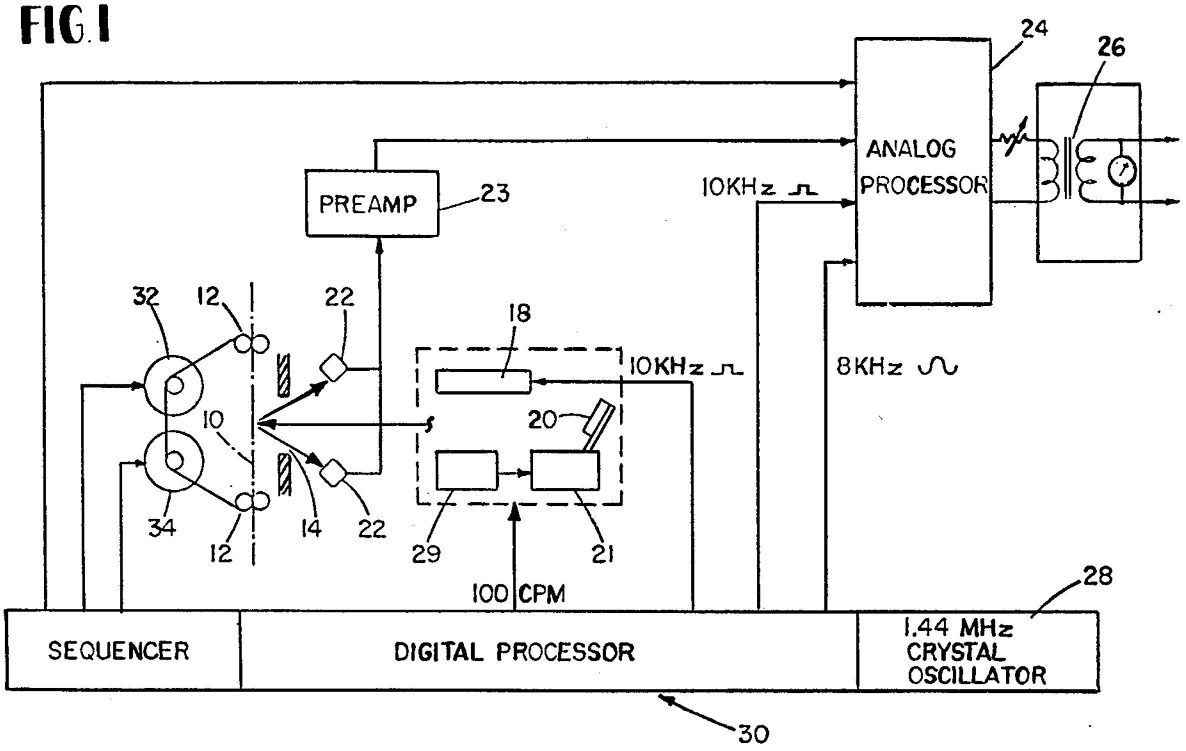
FIG. 1 is a schematic diagram of an image transmitter, showing fragments of the optical system.

A transmitter for producing and handling video signals from, e.g., a photograph or business document and for obtaining an amplitude modulated 2,000 cycle carrier for transmittion of the image is shown in FIGS. 1–3. The receiver in which the present invention is embodied is shown in FIGS. 4–7 and is described below.

Referring first to the transmitter, the subject photograph 10 is guided for vertical movement through motor driven rolls 12 past a scanning field defined by aperture 14. A laser (helium neon) 18 is modulated from full brightness to cutoff using a 10 KHz square wave. The laser beam is projected through an optical system onto the photograph. One of the elements in the optical system is a mirror 20 driven by galvanometer 21 which causes the beam to scan a standard line 11 ½ inches long at right angles to the direction of paper motion past aperture 14. The reflected light is picked up by an array of solar cells 22 which feed their output current in parallel to a preamplifier 23 where the current is amplified and bandlimited 8 to 12 KHz. Since this picture signal modulates a 10 KHz carrier, the preamplifier is immune from the effects of room light or DC drift.

The preamplifier output at a level high enough to avoid contamination by noise goes to an analog processing circuit 24 where the 10 KHz video signal is multiplied by an 8 KHz sinewave using an integrated circuit precision multiplier. The output of the multiplier is filtered to give a 2 KHz double sideband modulated signal which is then amplified and coupled by a transformer 26 to the telephone line.

The 10 KHz square wave and 8 KHz sinewave are both derived from an accurate crystal oscillator 28 operated at 1.44 MHz. The clock is also counted down to a 100 PPM pulse which is used to synchronize the sweep generator 29 which deflects the galvanometer driven mirror. The clock is part of the digital circuitry 30 which also implements the start and stop routine.

Paper sensors (not shown) are provided just above and below the scanning aperture. When the picture is inserted into the paper guide, and the start button is pushed, a high speed motor 32 moves the picture down until it is at the scanning aperture, after which a slower speed motor 34 is turned on and the paper is moved past the scanning aperture at the rate of 1 inch per minute. When the trailing edge of the picture is a short distance above the scanning aperture, one of the paper sensors detects this condition, shuts down the transmission, turns off the slow speed motor and turns on the high speed motor long enough to flush the paper out of the paper guide.

Referring more particularly to the optical system, as shown in FIG. 2, the axis 31 of laser 18 extends horizontally, parallel to the plane of aperture 14. The laser beam is reflected twice at right angles in the horizontal plane by mirrors 40 and 42, passes horizontally through beam expansion lens 44 to mirror 46 which reflects it vertically down to mirror 48, and is reflected by mirror 48 obliquely up at an acute angle (e.g., 15°, and preferably less than 30°) $\alpha$ to the horizontal into focusing lens 50 (flat field camera type, e.g., with a 3 inch aperture and f/3.5). Lens 50 collimates the light (and is aided in this function by the expansion lens) for incidence upon scanning mirror 20. Mirror 20 is tilted so that the beam it reflects will return horizontally through lens 50 and will be reflected by folding mirror 52 to aperture 14. As mirror 20 is oscillated about its scanning axis of rotation 54, the locus of positions of the beam it reflects approximates a horizontal plaen, and as the beam thus sweeps over that approximately planar scanning surface and is folded by mirror 52, it scans horizontally across aperture 14.

Scanning axis 54 is tilted out of the plane of mirror 20 toward the scanning surface from the side thereof on which the beam is incident on mirror 20, the axis thus making an acute angle with the scanning surface. Mirror 20 makes an angle with its scanning axis 54 equal to $\alpha$, making the scanned line across aperture 14 straight within measurable tolerances, even for very wide angle oscillation of mirror 20.

Figure 4:
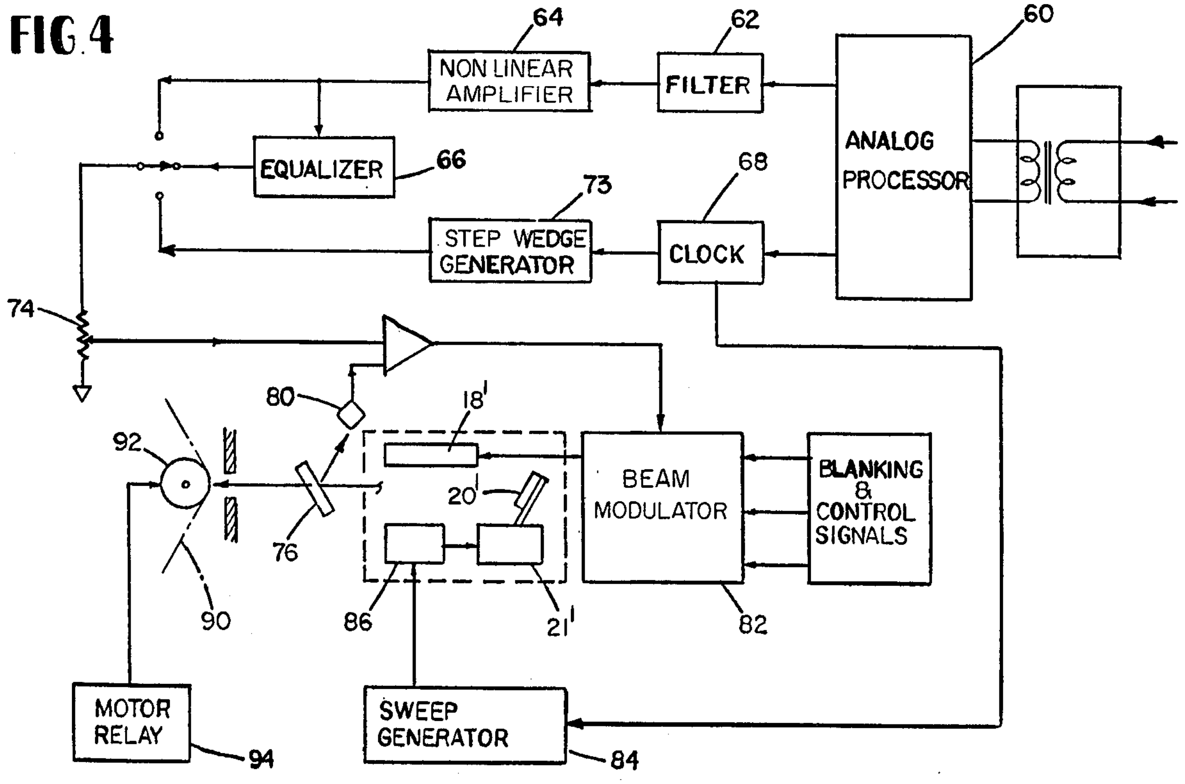
FIG. 4 is a schematic diagram, similar to FIG. 1, of a receiver embodying the invention and useful with the transmitter of FIGS. 1–3.

FIG. 4 illustrates a receiver embodying the invention and including the optical configuration described above in the transmitter, with the important addition of a beam separating aperture plate as described below and shown in FIGS. 5–7.

Referring first to FIG. 4, the signal received from the line is transformer coupled into analog processor 60. Here it is amplified and rectified. The additional operations of signal detection, voice immunity, automatic gain control, and dropout at the end of transmission are also accomplished in the analog processor. The output of the processor is a full-wave rectified signal which then passes through a filter 62 which removes the 4kc and higher components leaving only the baseband signal. This is then fed to a non-linear amplifier 64 which is a dc amplifier having a characteristic in which the output voltage corresponding to any level of input signal is proportional to the amount of light required to expose the dry silver paper used in the receiver, eventually developing exactly the right density. The required characteristic of the non-linear amplifier is derived by carefully measuring the D log E curve of the paper with the conditions of processing used. Then one works backwards from this to find the relationship between the light required to achieve a certain density on the paper and the signal which results at the transmitter from scanning that particular density. The output of the non-linear amplifier goes to an equalizer 66 which is a filter with high frequency emphasis. It recovers some of the high frequency power lost in the transmitter and receiver scanning apertures as well as the telephone line. Additional equalization can be used to crispen the picture somewhat above what would be achieved by a "flat" rendition of the frequencies in the original picture. The analog processor circuit also produces a phasing pulse at the end of the lineup tone. This pulse synchronizes a clock 68 which is a digital counter counting down from a 1.44 MHz crystal oscillator. The clock produces 100 PPM pulses which are used to drive the galvanometer 21′ which oscillates scanning mirror 20′. For calibration purposes the clock also produces timing signals which are used by generator 73 to generate a 14 step wedge which is automatically keyed in after the picture is detected and before the end of the lineup tone. Thus each received picture has a wedge on it which can be used to judge the correctness of the laser modulation and the heat processing of the paper.

The selected video goes to a potentiometer 74. The light falling on the paper is directly proportional to the video signal multiplied by the setting of potentiometer 74.

In order to get the light on the paper exactly proportional to the video signal, light feedback is used. A beam splitter 76 takes about 6% of the light coming out of laser 18′, for detection with a solar cell 80 and amplification. This signal is compared with the input video and the difference is used to drive the laser modulator 82. Since the loop gain is fairly high this guarantees that the feedback signal is essentially equal to the video signal. The modulator also has, as inputs, blanking and control signals from the clock and analog processor. These serve the purpose of keeping the laser off except when a picture is being received. The beam is also blanked during mirror retrace and the step wedge is automatically keyed in before the picture starts.

The 100 PPM pulses go to sweep generator 84 where a sawtooth voltage is produced. This in turn goes to deflection amplifier 86 to produce a proportional current. The current drives the galvanometer 21′.

Dry silver photosensitive paper 90, to be exposed by the modulated light, is motor driven over roller 92 under control of motor relay 94.

Figure 5:
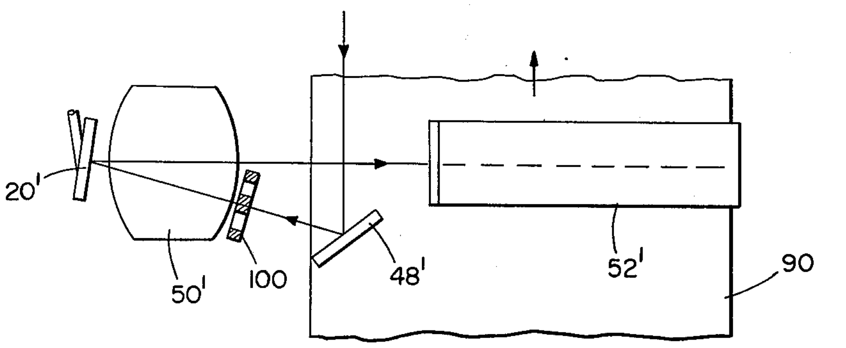
FIG. 5 is a view of receiver optics similar to a fragment of FIG. 2, but including the aperture plate of the invention.
Figures 6, 7:
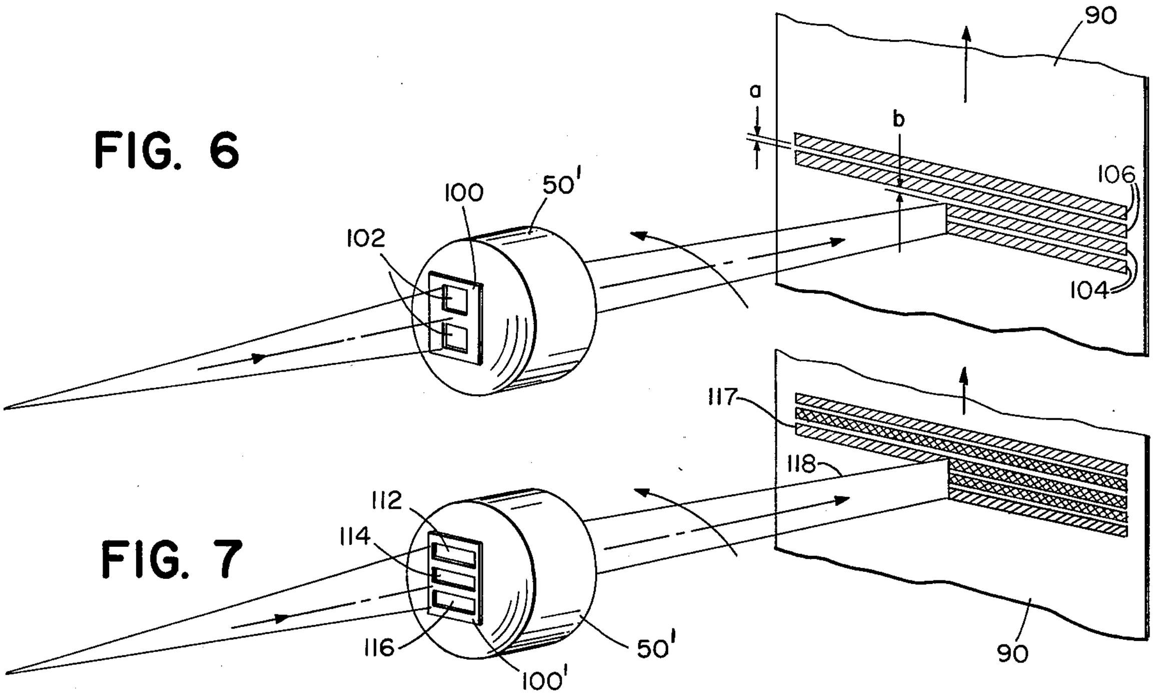
FIG. 6 is an optical diagram illustrating the function of the aperture plate.
FIG. 7 is a view similar to FIG. 6 of another embodiment.

Referring now to FIGS. 5 and 6, aperture plate 100 is located directly in front of (and preferably as close as possible to) lens 50′, to separate the light beam before it passes through lens 50′ onto oscillating mirror 20′. Plate 100 has two equal sized apertures 102 (in the embodiment shown the apertures are spaced apart by 0.05 inch and each is 0.1 inch square) which cause the light to ultimately image upon paper 90 in two sub-beams separated by the same distance as that between successive scans. That is, referring to FIG. 6 (a schematic diagram in which the optics between lens 50′ and paper 90 are omitted and in which bars 104 represent sub-beams of a current scan line and bars 106 sub-beams of the previous scan line), the distance a between sub-beams attributable to one main beam should equal the distance *b* between adjacent sub-beams attributable to successive main beams. The result of the beam separating and spacing is that all periodicity at the inherent scanning frequency is eliminated, and the effective scanning frequency is doubled. Any Moire patterns resulting from a graphical reproduction using a process with a graphical spatial frequency near the inherent receiver scanning frequency is accordingly at a frequency higher than that inherent scanning frequency and hence not noticeable.

FIG. 7 shows a further embodiment of the invention in which aperture plate 110 has three equal sized apertures 112, 114, 116, with the outer apertures 112 and 116 covered with partially light transmissive material to halve the intensities of the sub-beams passing through those apertures. The scanning is coordinated with the feed of paper 90 so that successive scans overlap to superimpose their respective adjacent outside sub-beams. For example, as illustrated in FIG. 7, sub-beam 118 of one scan is superimposed on sub-beam 117 of the previous scan. The result is an intensity averaging at the edges of adjacent beam scans, softening beam-to-beam contrast. This avoids overintensification of contrast lines in the original image which happen to coincide with the direction of scan in the transmitter. In other words, the scanning frequency in the transmitter may be tto coarse to pick up shading in the transition from a light to dark area of the original image, and may thus transmit an image in which that transition appears sharper than it was, giving a spurious superresolution. The averaging technique of the invention will restore the original shading, yet without degrading the authentic resolution desired for picture quality.

Figure 8:
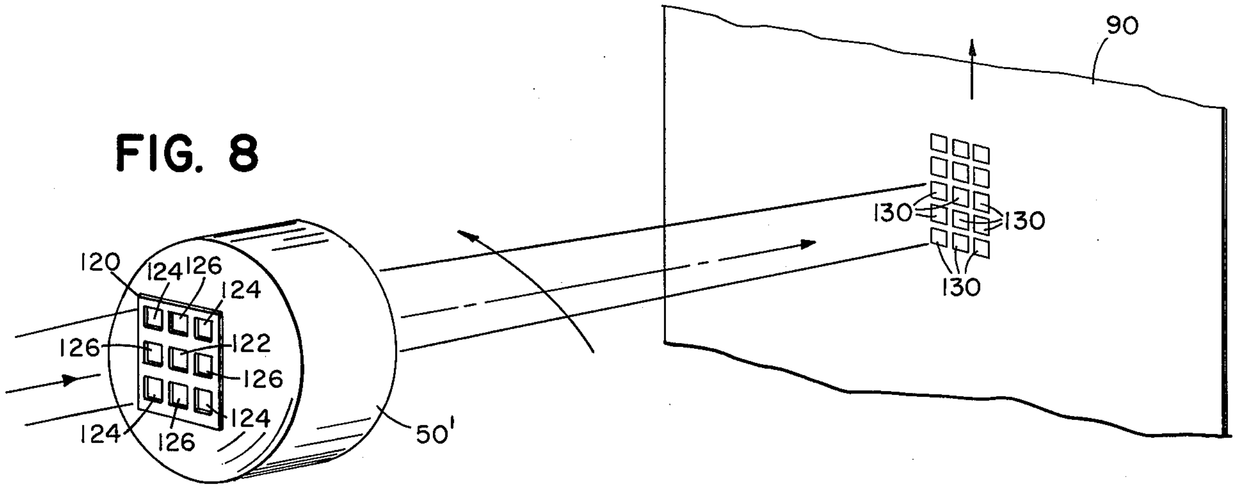
FIG. 8 is a view similar to FIG. 7 of another embodiment.

FIG. 8 shows a further embodiment of the invention in which aperture plate 120 has nine equal sized apertures 122, 124, and 126. Outside corner apertures 124 are covered with partially light transmissive material to reduce the intensities of the sub-beams passing through those apertures to one quarter of the intensity of the sub-beam passing through central aperture 122. The remaining outer apertures 126 are covered with partially light transmissive material to halve the intensities of the sub-beams passing therethrough. Unlike the receiver of FIG. 4, that of FIG. 8 embodies a digital system in which the beam is scanned in dots rather than lines, so that the problems of Moire patterns and spurious superresolution exist in two dimensions rather than one. Accordingly, aperture plate 120 divides the beam both vertically and horizontally so that at the imaging field 90 nine equally spaced sub-dots 130 appear in a 3 × 3 matrix in place of each single dot that would be present in the absence of plate 120. Further, successive matrices are overlapped to additively superimpose their respective adjacent outside sub-dots. The results of increased effective spatial scanning frequency and intensity averaging are as described above.

I claim:

1. In an electro-optical system for communication of images wherein a receiver receives signals and responsive thereto generates a modulated light beam, said receiver having beam deflection means which directs said beam in a periodic scan pattern against an image surface responsive to said beam to form an image thereon, the improvement wherein said receiver includes an aperture member positioned in said beam between its source and said beam deflection means, said aperture member having apertures therein forming said beam into a plurality of discrete sub-beams, adjacent sub-beams being at said surface displaced from one another in a direction non-parallel to the direction of beam scan, said receiver producing an image on said surface free of periodicity at the spatial frequency of said scan pattern.

2. The improvement as claimed in claim 1, said aperture member forming sub-beams of equal intensity and with displacements so proportional with respect to the scanning pattern that displacement between adjacent sub-beams respectively in different main beam scan positions is equal to displacement between adjacent sub-beams in a single main beam scan position.

3. The improvement in claim 1, wherein said system comprises a laser, a focusing lens, mirrors defining an optical path between said laser and said lens, a scanning mirror mounted behind said lens for receiving light passing therethrough, causing said light to scan said imaging field, and said aperture member mounted just in front of said lens.

4. The improvement of claim 1 wherein said aperture member includes apertures dividing said light beam into multiple sub-beams spatially separated along two orthogonal directions at said image surface.

5. The improvement as claimed in claim 1 said aperture member forming sub-beams with displacement between adjacent sub-beams to produce an overlapping on said surface of sub-beams from successive scan positions, said aperture member forming sub-beams of unequal intensity to provide equal exposure of said surface in overlapped and non-overlapped areas.

6. The improvement of claim 5 wherein said aperture member includes apertures dividing said light beam into a linear array of at least three sub-beams, including two outer sub-beams of half the intensity of an inner sub-beam, said apertures spaced to provide overlap at said imaging field of successive main beams to additively superimpose pairs of said outer sub-beams without superimposing said inner sub-beams thereby averaging light intensity at the beam edges.

7. The improvement of claim 6 wherein said aperture member includes at least three apertures, including outer apertures of lower transmissivity than an inner apertures.

8. The improvement in claim 7 wherein said apertures are equal in size.

9. The improvement of claim 5 herein said aperture member includes apertures dividing said beam into nine sub-beams arranged in a 3 × 3 matrix, including corner sub-beams of one quarter the intensity of the central sub-beam, and non-corner outside sub-beams of half the intensity of said central sub-beam, and means for causing overlap at said imaging field of successive main beams to additively superimpose sets of said outside sub-beams without superimposing said central sub-beams, thereby averaging light intensity at the beam edges.

* * * * *